April 19, 1966  W. S. MILLER  3,247,315
CONNECTOR FOR WIRES OR THE LIKE
Filed April 27, 1962  2 Sheets-Sheet 1
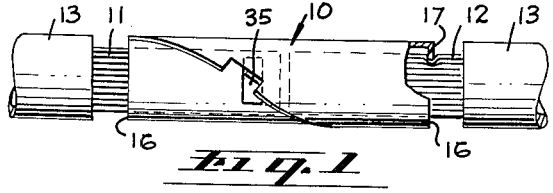
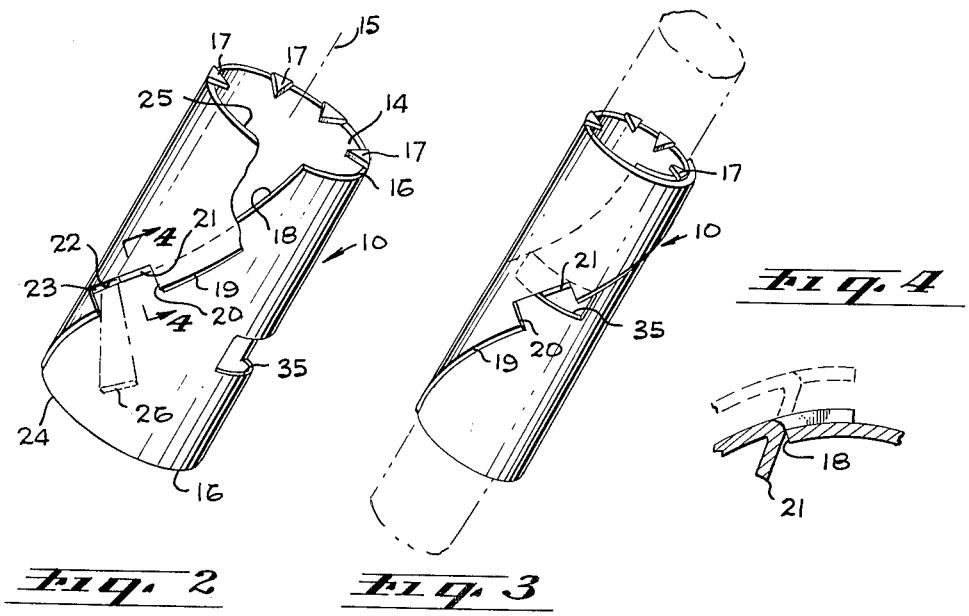
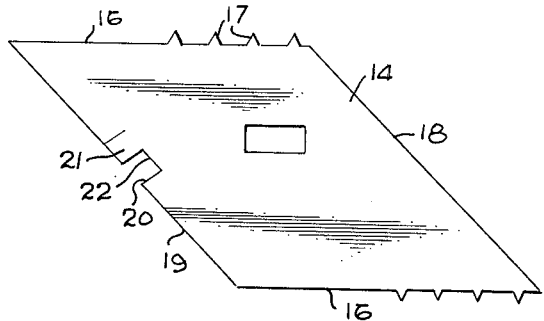
INVENTOR.
WENDELL S. MILLER
BY
William P. Green
ATTORNEY April 19, 1966 W. S. MILLER 3,247,315
CONNECTOR FOR WIRES OR THE LIKE
Filed April 27, 1962 2 Sheets-Sheet 2
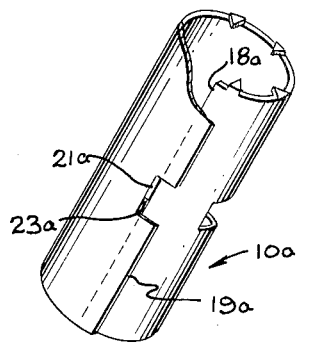
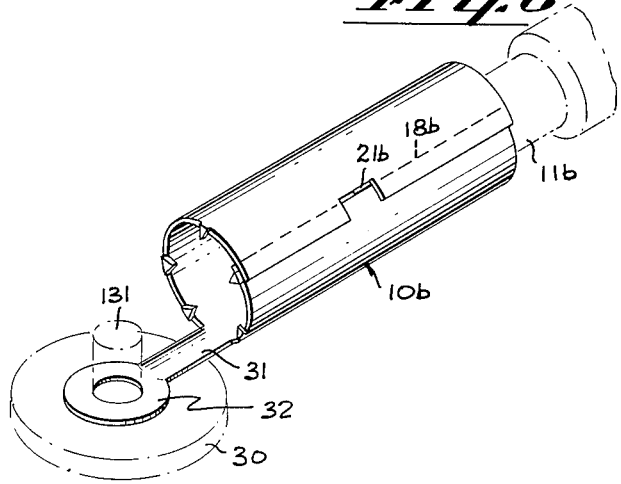
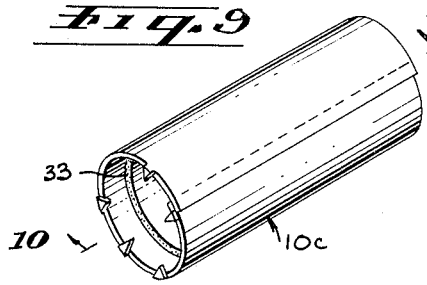
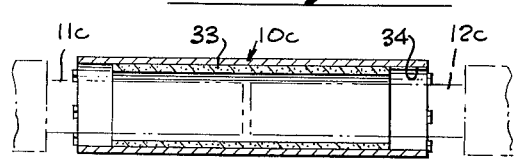
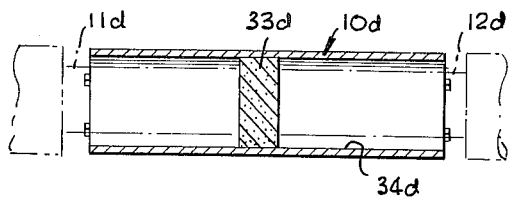
INVENTOR.
WENDELL S. MILLER
BY William P. Green
ATTORNEY //
United States Patent Office 3,247,315
Patented Apr. 19, 1966

3,247,315
CONNECTOR FOR WIRES OR THE LIKE
Wendell S. Miller, 1341 Comstock Ave.,
Los Angeles, Calif.
Filed Apr. 27, 1962, Ser. No. 190,656
13 Claims. (Cl. 174—84)

This invention relates to an improved type of connector, for forming a connection with an elongated element such as a wire, cable, rope or the like, and preferably for securing together adjacent ends of two such elements. As will appear, the invention is in certain respects particularly adapted for use in tightly joining together two electric wires, in a manner forming an effective and reliable electrical connection between the wires.

A major object of the invention is to provide a connector element which is adapted to be applied to the wires or other elongated members to be connected with much greater facility than is possible with conventional connector arrangements. A device embodying the invention is adapted to be easily actuated to a wire gripping condition by a single extremely simple manipulation of a conventional tool, such as a screw driver or pair of pliers. The connector is constructed to inherently tend to grip and form a tight connection with the elements being joined, but is restrained against such gripping action until the connector is purposely released by the discussed manipulation of the screw driver or other tool.

Structurally, a connector embodying the invention takes the form of a generally tubular member constructed of a piece of sheet form spring material, such as spring steel, adapted to extend about and retain the ends of the wires or other elements being connected. This sheet material may be initially flat, and be rolled to the generally tubular shape, and is therefore circularly discontinuous and adapated to be varied in diameter by, in effect, rolling the material more or less tightly as desired. The sheet form spring member has resilience tending to urge the tubular connector to a minimum diameter condition, smaller than the wires being joined, and therefore is capable of tightly constricting itself about, and effectively gripping and holding the wire ends.

Prior to application of the connector to the wires or other elements, the tubular spring type connector is retained in a radially expanded, enlarged diameter condition, larger than the ends of the elements being joined. For this purpose, there may be provided suitable shoulders on the sheet material engageable in a relation maintaining this expanded condition. Desirably, one of the shoulders takes the form of a tab near a first edge of the sheet material, which tab may be engageable with a second edge of the material in a relation maintaining the member at a large diameter. In order to secure the connector to one or more wires or the like, the wires are first inserted into the enlarged diameter connector element, and the shoulders are then actuated to a released condition in which they allow the tubular connector to rapidly constrict, by its own resilience, and thereby tightly grip and form effective connections with the wires. Certain features of novelty of the present invention reside in the method novelty residing in this unique manner of applying a connector member to elements which are to be joined together.

Additional method novelty resides in a method of forming the connector part to give it the required resilience tending to urge the tubular member to its minimum diameter condition. For this purpose, I find it desirable to first roll the sheet material to as small a diameter as possible, then heat treat the material in that condition to give it resilience tending to always return the material to that small diameter condition, and subsequently to expand the element and form the locking shoulder or shoulders thereon.

For increasing the effectiveness of the joint formed between the connector and the elements being joined, I find it desirable to provide the connector member with lugs or projections extending generally radially inwardly, to locally bite into and therefore tightly grip the wires or the like. In the preferred forms of the invention, these lugs are sharp teeth turned inwardly at the opposite ends of the tubular connector.

The above and other features and objects of the present invention will be better understood from the following detailed description of the typical embodiments illustrated in the accompanying drawing, in which:

FIG. 1 is a side view, partially broken away, showing a connector member embodying the invention as it appears after attachment to a pair of wires being joined;

FIG. 2 is an enlarged fragmentary perspective view of the FIG. 1 connector, shown in its expanded enlarged diameter condition;

FIG. 3 is a view similar to FIG. 2, but showing the connector after it has been constricted to the FIG. 1 gripping condition;

FIG. 4 is an enlarged fragmentary section taken on line 4—4 of FIG. 2;

FIG. 5 is a somewhat diagrammatic representation of the preferred method of forming the connector of FIGS. 1 to 4;

FIG. 6 represents the sheet metal blank from which the connector of FIGS. 1 to 4 is made;

FIG. 7 is a view similar to FIG. 2, but showing a variational form of the invention;

FIGS. 8 and 9 are perspective views of two additional forms of the invention;

FIG. 10 is a section taken on line 10—10 of FIG. 9; and

FIG. 11 is a sectional view similar to FIG. 10, but showing another form of the invention.

In FIG. 1, the connector is represented at 10, and is being utilized for securing together, and electrically connecting, two conductive wires or groups of wires 11 and 12, each of which may typically have the usual insulation 13, stripped back far enough to allow the conductive wires to extend into connector 10. As will be clearly understood from FIG. 2, the connector 10 is preferably formed from a single piece of sheet material 14 which is rolled to a desirably circular cross-section about the longitudinal axis 15 of the device. At its opposite axial ends, the tubular connector terminates in two end edges 16 lying in planes disposed parallel to one another and transversely of axis 15. At these end edges 16, portions of the sheet material are turned radially inwardly to form a plurality of inwardly directed teeth 17, which may taper toward axis 15 to sharp points capable of biting into and therefore tightly gripping wires 11 and 12.

The edges of the sheet material which are designated 18 and 19 circularly overlap one another to some extent in the FIG. 2 expanded condition of the connector, and overlap considerably more in the FIG. 3 contracted condition of the part. Edge 18 may curve helically about axis 15, and edge 19 may be parallel to edge 18 and similarly curved helically except at a location 20 at which edge 19 is interrupted. In the illustrated arrangement, the portion of the sheet material adjacent edge 19 is received at and engages the radially outer side of the portion of the sheet material which is adjacent edge 18.

At the location of cut-away 20, a portion of the material from within this cut-away is deformed or bent radially inwardly to form an essentially rigid tab 21 (see FIG. 4), which engages edge 18 in a manner locking the tubular member against radial constriction to its normal reduced diameter condition. Adjacent this tab 21, the material from the cut-away is completely removed at a location 22, to form a narrow opening 23 which is just large enough to allow the insertion of a screw driver radially inwardly into that opening or space 23.

The material from which part 10 is formed may be a suitable spring metal, such as spring steel, and should be sufficiently highly conductive electrically to conduct current between wires 11 and 12 without substantial loss. The spring material normally tends by its own resilience to return to a condition which is of even smaller diameter than the gripping condition of FIGS. 1 and 3, that is, the diameter is even smaller than that of the wires to be joined, so that the conductor will tightly grip those wires. Also, the material should have sufficient elasticity to be expandible to the FIG. 2 condition without exceeding the elastic limit of the material.

To discuss the method by which the connector 10 and wires 11 and 12 may be joined together to form the finished joint or splice of FIG. 1, assume first of all that the part 10 is supplied to the user in the expanded condition of FIG. 2, with the part being retained in this expanded condition, against its own resilience, by engagement of tab 21 with edge 18 (FIG. 4). With the connector in this condition, the user inserts wires 11 and 12 into the opposite ends of the FIG. 2 connector, and then releases the connector for automatic constriction, by virtue of its own resilience, into tight gripping engagement with the wires, as seen in FIGS. 1 and 3. Such release may be effected by any convenient method, as by squeezing the part 10 axially between the jaws of a pair of pliers, with the two jaws acting upwardly and downwardly against the FIG. 2 connector at the points designated 24 and 25 respectively. More particularly, one of the jaws may act upwardly against the sheet material near edge 18, while the other jaw acts downwardly against the sheet material near edge 19, and by virtue of the helical configuration of edges 18 and 19 these two points of engagement of the pliers may be axially opposite one another.

When the element is squeezed axially in this manner, the resultant force exerted by tab 21 against edge 18 may serve to cam tab 21 radially outwardly, as to the broken line position of FIG. 4, to thereby release the locking engagement between the tab and edge 18 (referred to as a shoulder in some of the claims), with the result that tab 21 may then move circularly past edge 18 and allow the entire unit to constrict to the FIG. 3 condition. To allow for such camming action, tab 21 may have the angularity illustrated in FIG. 4. That is, the tab has an angularity to advance progressively away from edge 18 as the tab advances radially inwardly. Also, if the tab is viewed from its radially outer side, it has a second angularity corresponding to the helical pitch or angularity of the engaged edge 18. Together, these angularities cause automatic release of the holding tab when the element is squeezed between two plier jaws as discussed, but the angularity of the tab is not sufficient to cause such release in response merely to the force exerted by the resilient spring material itself.

A second way of releasing the tab is to insert a screw driver (26 in FIG. 2) radially into the space 23, and then move the screw driver to pry the tab carrying portion of the sheet material radially outwardly far enough to allow tab 21 to pass edge 18 in the manner illustrated in FIG. 4.

In the constricted FIGS. 1 and 3 condition of unit 10, tab 21 may project inwardly through a circularly extending slot 35 formed in the inner portion of sheet metal element 10, and into engagement with one of the wires 11 or 12, to prevent the tab from holding the tab carrying portion of element 10 in an outwardly sprung condition. Also, it should be noted that the metal of part 10 may if desired be copper plated and tinned in order to maximize its conductivity, as well as the solderability of the metal if the joint is to be completed by soldering. In this connection, maximum solderability is especially significant in certain forms of the invention which will be discussed at a later point and which contemplate soldering as an important step in the wire joining process.

It will be apparent from the above discussion of the structure of the item of FIGS. 1 through 4 how that connector may be formed by rolling up an initially flat sheet metal blank of the shape illustrated in FIG. 6. In a preferred method of forming the connector from this blank, the blank may first be rolled to a very small diameter condition represented in full lines at 27 in FIG. 5. The internal diameter of the blank in this condition is considerably smaller than the ultimate diameter of the connector in FIG. 1. In FIG. 5, the final gripping diameter of the tubular connector is represented at 28. Until the blank reaches the small diameter condition represented at 27, the spring metal is in an untempered condition, and is substantially nonresilient and very easily deformed. After the blank has been bent to the condition represented at 27, the spring metal is heat treated, by tempering, to render it highly resilient, with the metal always thereafter tending to return by its own resilience to the small diameter condition designated 27. Next, the material may be expanded, against its own resilience, to a diameter 29, greater than the ultimate gripping diameter 28, and typically corresponding approximately to or slightly greater than the FIG. 2 diameter. The teeth 17 and tab 21 may, up to this point, still be undeformed to their final inturned conditions, and may be bent to those inturned conditions only after expansion to the enlarged diameter 29. Tab 21 is then moved into engagement with edge 18, and the construction of the item is complete. With regard to the teeth 17, it is noted from FIG. 6 and the other figures that these teeth are not formed on the portion of the sheet material which is adjacent edge 19 and which overlaps the opposite edge 18 in the final applied condition of the connector.

FIG. 7 shows a second form of the invention which may be considered as identical with that of FIGS. 1 to 6 except that the edges 18a and 19a (corresponding to edges 18 and 19 of FIG. 2) extend directly axially, rather than helically. When formed in this manner, the device 10a is not as easily releasable from its expanded condition by means of a pair of pliers, but may be easily released by insertion of a screw driver into a space or opening 23a adjacent tab 21a.

In the form of the invention shown in FIG. 8, the tubular wire gripping portion 10b of the connector is adapted to receive and grip the end 11b of a single wire, which is to be connected to a terminal 30 or other conductive structure. For attachment to terminal 30, the sheet material which forms the gripping element 10b may have a portion 31 projecting from one of its ends, and integral with the gripping element 10b, with portion 31 being shaped to provide a loop or circle 32 through which a threaded stud projecting from terminal 30 may extend, so that a nut may be connected onto stud 31 and tighten the connector loop 32 to the terminal. Portion 10b may be essentially the same as connector device 10a of FIG. 7, or may be of the helical type shown in FIGS. 1 through 6. The resilient sheet material forming portion 10b is retained in the initial enlarged diameter condition of FIG. 8 by engagement of tab 21b with edge 18b. After wire 11b has been inserted into the enlarged diameter portion 10b of the connector, the tab 21b may be released in the previously discussed manner, to allow portion 10b to constrict to a reduced diameter condition and tightly grip wire 11b.

FIGS. 9 and 10 show another form of the invention which may be the same as that shown in FIG. 7 except that, instead of retaining the element 10c in its initial enlarged diameter condition by means of a tab such as that shown at 21a in FIG. 7, the constrictable sleeve is retained in expanded condition by means of a tube 33 formed of solder. In using the device of FIGS. 9 and 10, two wires 11c and 12c may first be inserted into opposite ends of the unit, to positions of reception within solder tube 33, following which heat is supplied to the metal of tubular element 10c, by means of a soldering iron, torch, or the like. This heat ultimately raises the temperature of the metal of element 10c to a point at which it melts the solder 33, thereby freeing the element 10c for constriction to a reduced diameter by virtue of its own resilience, to form an effective joint with wires 11c and 12c. As element 10c constricts, it forces the melted solder from tube 33 to tightly engage wires 11c and 12c, and upon cooling to form a solder joint between the wires and part 10c. To facilitate the formation of this joint, the combination may contain an appropriate flux substance, as by providing this within the solder itself, or coating the solder, or as a coating on the inner surface 34 of part 10c.

FIG. 11 shows a form of the invention which is the same as that of FIGS. 9 and 10 except that the solder is provided in the form of a central circular plug 33d, located at the center of the length of constrictable element 10d, and retaining that element in an initially expanded condition. The inner surface 34d of resilient member 10d may be coated with a suitable resin adapted to serve as a flux for enhancing the formation of a solder joint. To use this FIG. 11 device, the wires 11d and 12d are inserted into opposite ends of part 10d, typically into engagement with the opposite sides of transverse plug 33d, following which heat is applied to the outer surface of part 10d by a soldering iron or the like, until solder 33d melts and releases part 10d for resilient constriction tightly against the wires. The constriction of part 10d forces the melted solder into tightly bonding engagement with wires 11d and 12d, and into the space about the wires and radially between the wires and part 10d. As the solder cools, it therefore forms a very effective joint between the two wires and connector 10d.

In both of the two last described forms of the invention, that is the form of FIGS. 9 and 10, and the form of FIG. 11, the solder 33 or 33d should have a melting point which is low enough that it will not destroy or adversely affect the temper of the metal of part 10c or 10d.

I claim:

1. A connector for attachment to an end of an elongated element, said connector comprising a generally tubular member formed of sheet form spring material adapted to extend about and retain said end of the element, said spring material being circularly discontinuous to present two edges which are shiftable relative to one another generally circularly about said element in a relation varying the internal size of said member, the resilience of said member tending to tighten the member by its own resilience to a small transverse dimension condition for securing said member and element together, and means fixed to said member for retaining said member in a larger dimension condition for initial reception of said end of the element and releasable to free the member for constriction by its own resilience to said small dimension condition while said means remain fixed to said member.

2. A connector for attachment to an end of an elongated element, said connector comprising a generally tubular member formed of sheet form spring material adapted to extend about and retain said end of the element, said spring material being circularly discontinuous to present two edges which are shiftable relative to one another generally circularly about said element in a relation varying the internal size of said member, the resilience of said member tending to tighten the member by its own resilience to a small transverse dimension condition for securing said member and element together, and means for retaining said member in a larger dimension condition for initial reception of said end of the element and releasable to free the member for constriction by its own resilience to said small dimension condition, said last mentioned means including a tab on said member projecting radially inwardly and engageable with another part of said member to retain the member in said larger diameter condition.

3. A connector for attachment to an end of an elongated element, said connector comprising a generally tubular member formed of sheet form spring material adapted to extend about and retain said end of the element, said spring material being circularly discontinuous to present two edges which are shiftable relative to one another generally circularly about said element in a relation varying the internal size of said member, the resilience of said member tending to tighten the member by its own resilience to a small transverse dimension condition for securing said member and element together, and soldering material retaining said member in a larger dimension condition for initial reception of said end of the element and adapted upon melting to free the member for constriction by its own resilience to said small dimension condition and to solder the member to said element.

4. A connector for attachment to an end of an elongated element as recited in claim 3, in which said soldering material is a tube received within said member and into which said element is projectible.

5. A connector for attachment to an end of an elongated element, said connector comprising a generally tubular member formed of sheet form spring material adapted to extend about and retain said end of the element, said spring material being circularly discontinuous to present two edges which are shiftable relative to one another generally circularly about said element in a relation varying the internal size of said member, the resilience of said member tending to tighten the member by its own resilience to a small transverse dimension condition for securing said member and element together, said edges being of essentially helically curving configuration, and means forming two shoulders integral with said member and engageable to retain said member in a larger dimension condition for initial reception of said end of the element and releasable to free the member for constriction by its own resilience to said small dimension condition.

6. A connector for attachment to an end of an elongated element, said connector comprising a generally tubular member formed of sheet form spring material adapted to extend about and retain said end of the element, said spring material being circularly discontinuous to present two edges which are shiftable relative to one another generally circularly about said element in a relation varying the internal size of said member, the resilience of said member tending to tighten the member by its own resilience to a small transverse dimension condition for securing said member and element together, and means forming two shoulders fixed to different portions of said member engageable in a relation retaining said member in a larger dimension condition for initial reception of said end of the element and releasable from holding engagement to free the member for constriction by its own resilience to said small dimension condition while said shoulders remain fixed to said different portions of said member, there being a space between predetermined portions of said member adapted to receive a releasing tool in a relation such that the tool may pry said predetermined portions relative to one another in predetermined directions and thereby release said shoulders to constrict said member.

7. A connector for attachment to an end of an elongated element, said connector comprising a generally tubular member formed of sheet form spring material adapted to extend about and retain said end of the element, said spring material being circularly discontinuous to present two edges which are shiftable relative to one another generally circularly about said element in a relation varying the internal size of said member, the resilience of said member tending to tighten the member by its own resilience to a small transverse dimension condition for securing said member and element together, and a tab formed on said member near one of said edges and engageable with a part of the member near the other edge in a relation retaining said member in a larger dimension condition for initial reception of said end of the element and releasable to free the member for constriction by its own resilience to said small dimension condition, there being a gap between predetermined portions of said member adjacent said tab adapted to receive a screw driver in a relation such that the screw driver may pry said edges generally radially relative to one another and thereby release said tab from engagement with said part of the member.

8. A connector for joining together the ends of two elongated elements, said connector comprising a generally tubular member formed of sheet form spring material adapted to extend about and retain said ends of both of the elements, said spring material being circularly discontinuous to present two edges which are shiftable relative to one another generally circularly about said elements in a relation varying the internal size of said member, the resilience of said member tending to tighten the member by its own resilience to a predetermined small transverse dimension condition for securing together said elements, and means integral with said member for retaining said member in a larger dimension condition for initial reception of said ends of the elements and releasable to free the member for constriction by its own resilience to said small dimension condition while said means remain fixed to said member.

9. A connector for joining together the ends of two elongated elements, said connector comprising a generally tubular member formed of sheet form spring material adapted to extend about and retain said ends of both of the elements, said spring material being circularly discontinuous to present two edges which are shiftable relative to one another generally circularly about said elements in a relation varying the internal size of said member, the resilience of said member tending to tighten the member by its own resilience to a predetermined small transverse dimension condition for securing together said elements, and a tab formed on and integral with said member near one of said edges and engageable with the other of said edges in a relation retaining said member in a larger dimension condition for initial reception of said ends of the elements and releasable to free the member for constriction by its own resilience to said small dimension condition.

10. A connector for attachment to an end of an elongated element, said connector comprising a generally tubular member formed of sheet form spring material adapted to extend about and retain said end of the element, said spring material being circularly discontinuous to present two edges which are shiftable relative to one another generally circularly about said element in a relation varying the internal size of said member, the resilience of said member tending to tighten the member by its own resilience to a small transverse dimension condition for securing said member and element together, and means for retaining said member in a larger dimension condition for initial reception of said end of the element and releasable to free the member for constriction by its own resilience to said small dimension condition, said edges of the member overlapping one another circularly in said larger dimension condition and being movable farther into overlapping relation in said small dimension condition.

11. A connector for attachment to an end of an elongated element, said connector comprising a generally tubular member formed of sheet form spring material adapted to extend about and retain said end of the element, said spring material being circularly discontinuous to present two edges which are shiftable relative to one another generally circularly about said element in a relation varying the internal size of said member, the resilience of said member tending to tighten the member by its own resilience to a small transverse dimension condition for securing said member and element together, and means forming two shoulders on said member engageable to retain said member in a larger dimension condition for initial reception of said end of the element and releasable to free the member for constriction by its own resilience to said small dimension condition, said shoulder having camming angularity acting to cam the shoulders apart to released condition in response to the exertion of opposite axial forces against opposite ends of said tubular member.

12. A connector for attachment to an end of an elongated element, said connector comprising a generally tubular member formed of sheet form spring material adapted to extend about and retain said end of the element, said spring material being circularly discontinuous to present two edges which are shiftable relative to one another generally circularly about said element in a relation varying the internal size of said member, the resilience of said member tending to tighten the member by its own resilience to a small transverse dimension condition for securing said member and element together, and means forming two shoulders on said member engageable to retain said member in a larger dimension condition for initial reception of said end of the element and releasable to free the member for constriction by its own resilience to said small dimension condition, said shoulders having camming angularity acting to cam the shoulders apart to released condition in response to the imposition of predetermined forces on said member.

13. A connector for attachment to an end of an elongated element, said connector comprising a generally tubular member formed of sheet form spring material adapted to extend about and retain said end of the element, said spring material being circularly discontinuous to present two edges which are shiftable relative to one another generally circularly about said element in a relation varying the internal size of said member, the resilience of said member tending to tighten the member by its own resilience to a small transverse dimension condition for securing said member and element together, and means for retaining said member in a larger dimension condition for initial reception of said end of the element and releasable to free the member for constriction by its own resilience to said small dimension condition, said last mentioned means including a tab on said member projecting radially inwardly and engageable with another part of said member to retain the member in said larger diameter condition, said member having an opening through which said tab projects inwardly in said small dimension condition.

References Cited by the Examiner

UNITED STATES PATENTS

| | | |
|---|---|---|
| 1,343,251 | 6/1920 | Dillon. |
| 2,109,517 | 3/1938 | Xenis. |
| 2,346,166 | 4/1944 | Hurleman _____ 399—58 X |

JOHN F. BURNS, *Primary Examiner.*

JOHN P. WILDMAN, DARRELL L. CLAY,
*Examiners.*